United States Patent [19]

Baumuller

[11] Patent Number: 5,766,736
[45] Date of Patent: Jun. 16, 1998

[54] STOCK MATERIAL FOR FEEDING MACHINES FOR MAKING DUNNAGE PRODUCTS

[75] Inventor: Theodore Baumuller, Schweighouse Sur Moder, France

[73] Assignee: Naturembal S.A., Bouxwiller, France

[21] Appl. No.: 690,743

[22] Filed: Aug. 1, 1996

[30] Foreign Application Priority Data

Jul. 16, 1996 [FR] France ................... 96 09045

[51] Int. Cl.⁶ .................................... B32B 3/06
[52] U.S. Cl. ................... 428/198; 428/201; 428/211; 428/906; 156/291; 156/324
[58] Field of Search .................... 428/201, 211, 428/198, 195, 906; 156/324, 290, 291

[56] References Cited

U.S. PATENT DOCUMENTS

| 2,711,781 | 6/1955 | Langer | 154/42 |
|---|---|---|---|
| 4,109,040 | 8/1978 | Ottaviano | 428/129 |
| 4,287,846 | 9/1981 | Klein | 118/212 |
| 4,806,410 | 2/1989 | Armington et al. | 428/126 |
| 4,839,210 | 6/1989 | Komaransky et al. | 428/77 |
| 5,143,776 | 9/1992 | Givens | 428/194 |

FOREIGN PATENT DOCUMENTS

| 0679504 | 11/1995 | European Pat. Off. . |
|---|---|---|
| 2100259 | 3/1972 | France . |
| 2483321 | 12/1981 | France . |
| 1303455 | 12/1971 | Germany . |
| 9213273 | 12/1992 | Germany . |
| 1091588 | 11/1967 | United Kingdom . |
| 1150439 | 4/1969 | United Kingdom . |

*Primary Examiner*—Alexander Thomas
*Attorney, Agent, or Firm*—Wood, Herron & Evans

[57] ABSTRACT

Material for feeding a machine producing cushioning dunnage products comprises a continuous strip having at least two superimposed paper-like layers, the layers being glued in a variable width axial area by a gluing material applied according to a periodic curve, in the plan of the axial area, between the layers, the width of the area being adjustable by controlling the amplitude of the curve.

16 Claims, 3 Drawing Sheets

5,766,736

STOCK MATERIAL FOR FEEDING MACHINES FOR MAKING DUNNAGE PRODUCTS

FIELD OF THE INVENTION

This invention relates generally to a material for feeding a machine producing cushioning dunnage, said material being a continuous strip having at least two superimposed sheet-like layers, for instance of paper. The invention relates also to a method and a mechanism especially designed for producing this material.

BACKGROUND OF THE INVENTION

The machines producing dunnage product using the material of the invention generally crumple the stock material running in a continuous strip, said crumpling being sometimes combined with other operations increasing the volume of the material. The final product must however be maintained in its final state, so that one can handle it without altering it. It must especially keep its resiliency and elasticity, given by the crumpling operation.

Thus, a double-layer band leads to better results than a single-layer one, because of the improved rigidity of the continuous strip, but also because the final dunnage product is then volumically more developed due to the spaces appearing between the layers.

For maintaining the stability of the dunnage product, for improving the mechanical characteristics of the two layers and for making easier their passage in said machines, it is however preferable that the two layers be fixed to one another, for instance glued together. The easiest and less expansive way to glue them together should be a central axial linear gluing. However, due to the specific nature of the operations performed in combination with the crumpling operation to make the final dunnage product, it is preferable to increase the width of the glued area, or to glue the layers in two transversally distinct places. To get the maximal volume, it is moreover better not to glue the lateral edges of the dunnage product. One solution could be to glue lengthwise in two parallel lines located in the central area, but that would increase the implementation's difficulties, and consequently the production's costs.

Another problem met with the linear gluing is that it causes the formation of rolls increasing the thickness of the strip in the glued area, and it is then more difficult to roll or transversely fold the material, these operations being however needed for instance for stocking said material.

SUMMARY OF THE INVENTION

Accordingly, an object of the invention is to provide a continuous material with at least two superimposed and glued layers, the gluing area being in a central axial band having a width bigger than the width of a single linear thin line of glue. With the new and original making way of the invention, the glued area does not form a roll which could prevent the material from being rolled or folded in good conditions.

Another object of the invention is to allow the production of the material in making significant glue savings or one hand, and allowing on the other hand the use of a large range of papers, non limited to high quality papers.

A still further object is to produce said material at a high production's rate.

A still further object is to provide a technical solution which can easily by applied to the mechanisms making such multilayers materials as well as a method implementing this solution.

According to the invention, the material is characterized in that said layers are glued in a variable width axial area by a gluing material put according to a periodic curve, in the plan of said axial area, between the layers, the width of said area being adjustable by controlling the amplitude of the curve.

Said curve is preferably sinusoidal like, preferably located centrally in relation with the transverse size of the layers.

One of the most interesting advantages of the material according to the invention is that all types of paper can be employed, and more particularly all different grammages. Thus, at least one of the layers or web may consist of Kraft paper.

When one or the two webs are made of Kraft paper, the latter can be chosen between all of the market available qualities.

As far as the glue saving is concerned, the putting of the glue is preferably achieved discontinuously. This prevents moreover the glued area from getting too wet.

The gluing of paper webs, when performed continuously, results in some restraints increasing if the producing speed increases: it is then necessary that the speed of the drying of the glue be high, allowing the stocking of the material, for instance by winding the multiply webs around a roll, in the best conditions, that means without damaging or deforming the glued area of each layer. Moreover, in such a situation, the glue cannot go through the layers, which would result in gluing all the roll in one block. This is even more true since the deposit of the glue is not continue, so that the glue is better distributed.

The used gluing material is preferably an emulsion of plastified homopolymeric polyvinyl acetate drying quickly. This glue is also characterized by a high molecular weight and an average viscosity appropriate for papers.

The chosen papers can even be biodegradable and recyclable. Due to the aforementioned particularities, the chosen glue does not damage or weaken said papers, although they are generally considered as less solid, especially when they are moistened.

The multiply continuous paper-like band finally produced can then take several shapes for feeding a machine producing cushioning dunnage. It can be for instance wound around an axis to form a roll which is then continuously unwound to be folded and crumpled in said machine.

The invention relates also to a method for making such a band, characterized in that it comprises the following steps:

unwinding the webs forming the layers parallely and at the same speed, the non identical central axes of said webs when unwound being in a plane perpendicular to the planes of the webs themselves;

gluing the facing sides of said webs, according to a periodic curve having an amplitude defining a gluing axial area;

bringing into contact the facing surfaces of said webs so that said central axes are getting merged.

Lastly, the invention relates to a mechanism for making the multilayer material of the invention, the main characteristic of which being that the periodic curve drawn by the gluing material is performed on at least one layer by means of a buckled wheel having its periphery in contact on one hand with a system putting some glue on said periphery and on the other hand with said layer, said buckled wheel being moved when said layers are getting unwound, both speeds being then synchronized.

In order to save gluing material and also to prevent the low quality papers from being too much moistened, the buckled wheel is castellated.

The curve of the gluing material is in the latter case still the same, but the deposit is not continuous.

In most of the known dunnage products, and particularly in those for which the invention has been made the two lateral edges of the stock material are inwardly rolled, then crumpled, and the edges are finally connected in the central area of the band. This connecting operation is performed along an axial area having a predetermined width, corresponding approximately to the gluing area, and improves the quality of the crumpling of the dunnage product finally obtained.

Other objects and advantages of the invention will be apparent from the following description taken in conjunction with the accompanying drawings wherein:

DETAILED DESCRIPTION OF THE INVENTION

Figure 1:
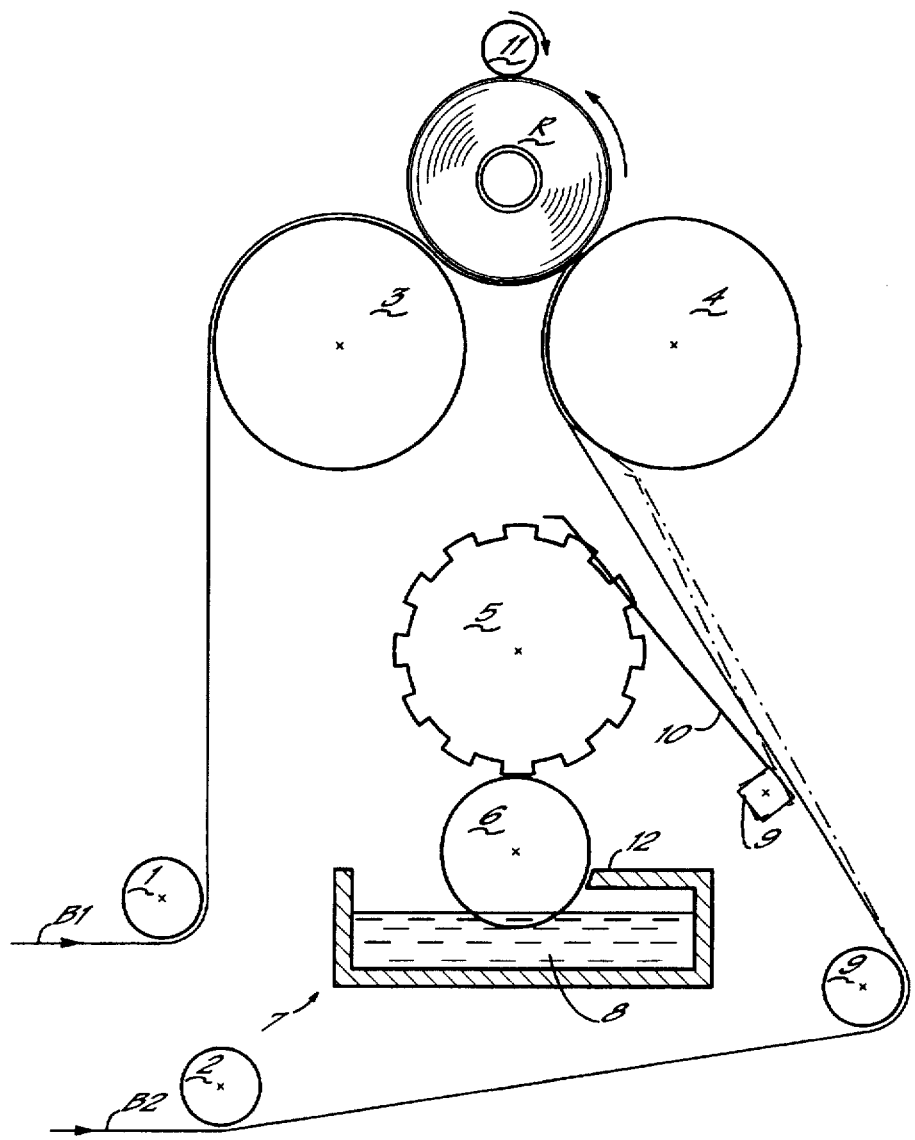
FIG. 1 is a diagrammatic sectioned view of the paths followed by the two webs, showing the gluing device.

Referring now again to the drawings, they present a preferential embodiment of the several components of the invention. In FIG. 1, the two webs B1, B2 follow two different paths and are wound in contact to one another, thus forming a roll R more particularly illustrated in FIG. 5.

The elements which are common to the two paths are in first the entrance rolls 1, 2, and in second the carrying rolls 3, 4 driving the webs B1, B2. The path of the latter web B2 includes a section in which it is glued by the castellated wheel 5, which is itself in contact with a wheel 6 called "paddling" wheel, partially submerged in a tray 7 filled with glue 8. The path of B2 passes moreover via a roll 9.

Said path of B2 is tangential to said castellated wheel 5, between said roll 9 and said carrying roll 4, at the level of a metal sheet 10 including a notch (see FIGS. 2, 3) allowing a contact between B2 and said wheel 5. The speed of the peripheral teeth of said wheel 5 is synchronous with the driving of B1, B2.

Said metal sheet 10 has moreover a particular function: it puts the web B2 away from said wheel 5, preventing it from getting glued in contact with said wheel when the glue dries, when the machine is not working. The separation results from a motion of said metal sheet, caused by jacks acting on a square-section pipe 19, on which said metal sheet 10 is mounted (see FIG. 4).

In the embodiment illustrated in FIG. 1, there is also a pressure roll 11, always in contact with the wound roll R during the making period, as well as a device 12 scraping the surplus of glue on the wheel 6. The castellated wheel covers its teeth with glue by tangential contact with the wheel 6 rotating also uniformly, so that the amount of glue is approximately identical on every teeth.

Figure 2:
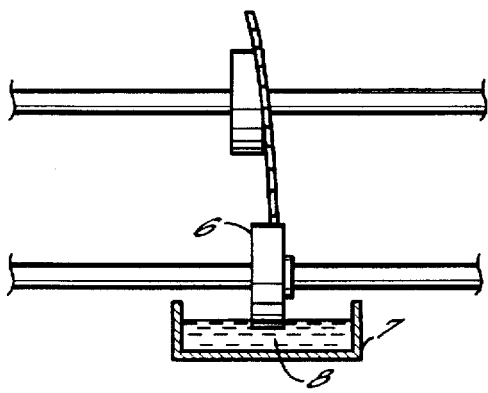
FIG. 2 is an elevational front view of the gluing device.
Figure 5:
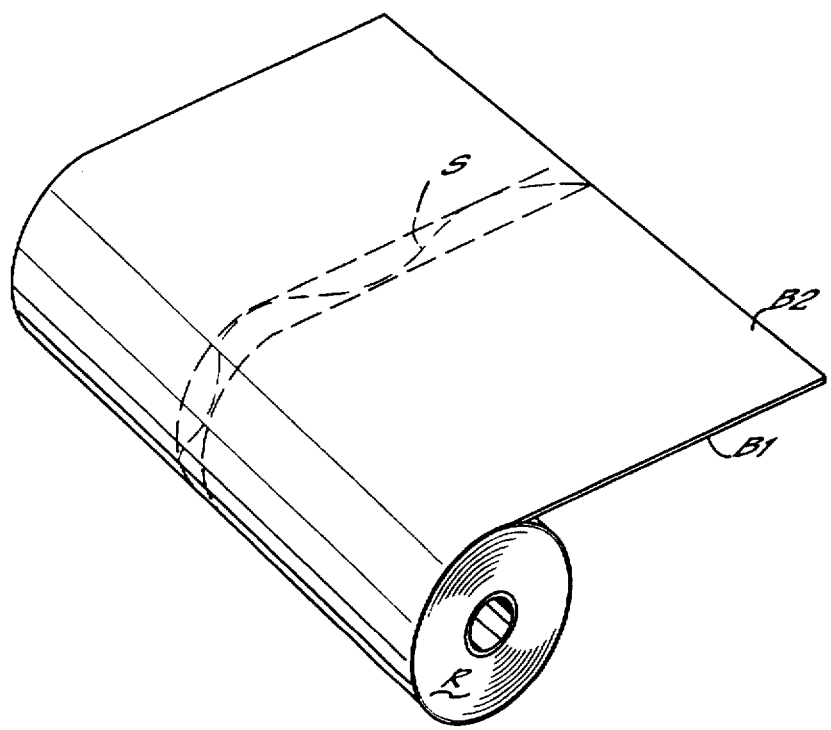
FIG. 5 is a perspective view of a roll ready to be used.

FIG. 2 illustrates diagrammatically the shape of said wheel 5, which is buckled for distributing the glue according to a curve having a width equal to the amplitude of the sinusoidal curve. Said width is also shown in FIG. 5 with the area referred to as S, defined by the dotted lines. The variation of the buckling of the wheel 5 imposes the variation of the width of the area S.

Figure 3:
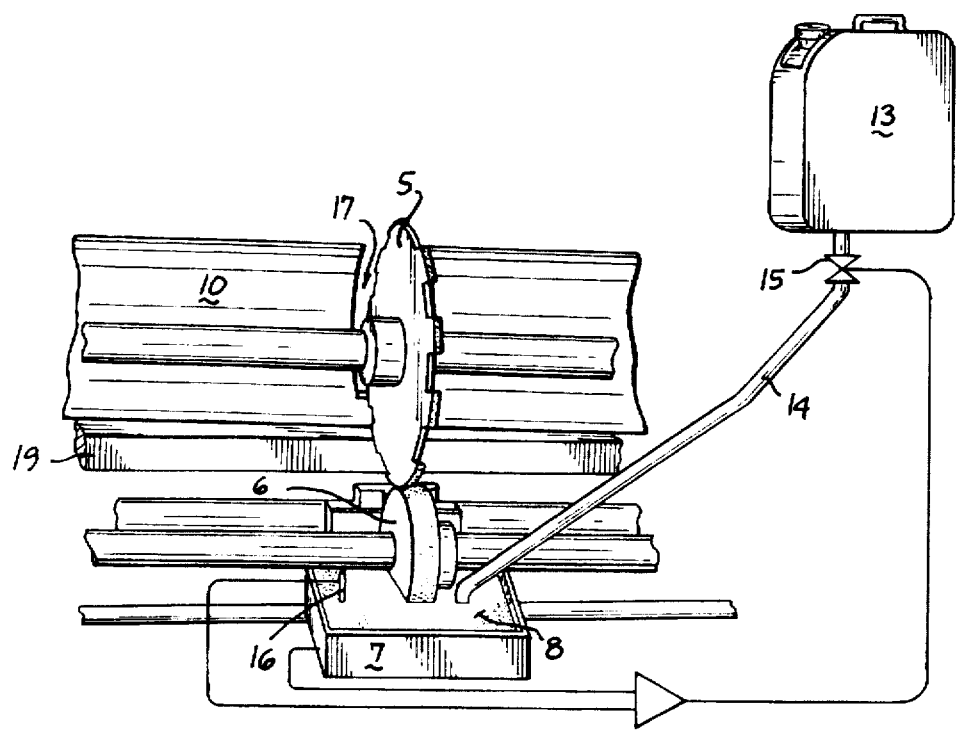
FIG. 3 is a perspective enlarged view of the device illustrated in FIG. 2.

FIG. 3 illustrates the same elements as in FIG. 2, in perspective view, but with a glue container 13, linked to the tray 7 by a pipe 14. The level of glue 8 in said tray 7 is measured and an electromagnetic gate or equivalent is then servocontrolled. The resistance between an electrode 16 and the tray 7 is for instance measured, which of course is different if said electrode is partially or not submerged in the glue 8. This information, measured in a loop, is transmitted to the servocontrol of the electromagnetic gate 15, as diagrammatically illustrated in FIG. 3.

The metal sheet 10 is also shown in this figure, in gray tint, including a notch 17 allowing the band B2 (not represented) to be tangential to the castellated wheel 5, and thus to be glued.

Figure 4:
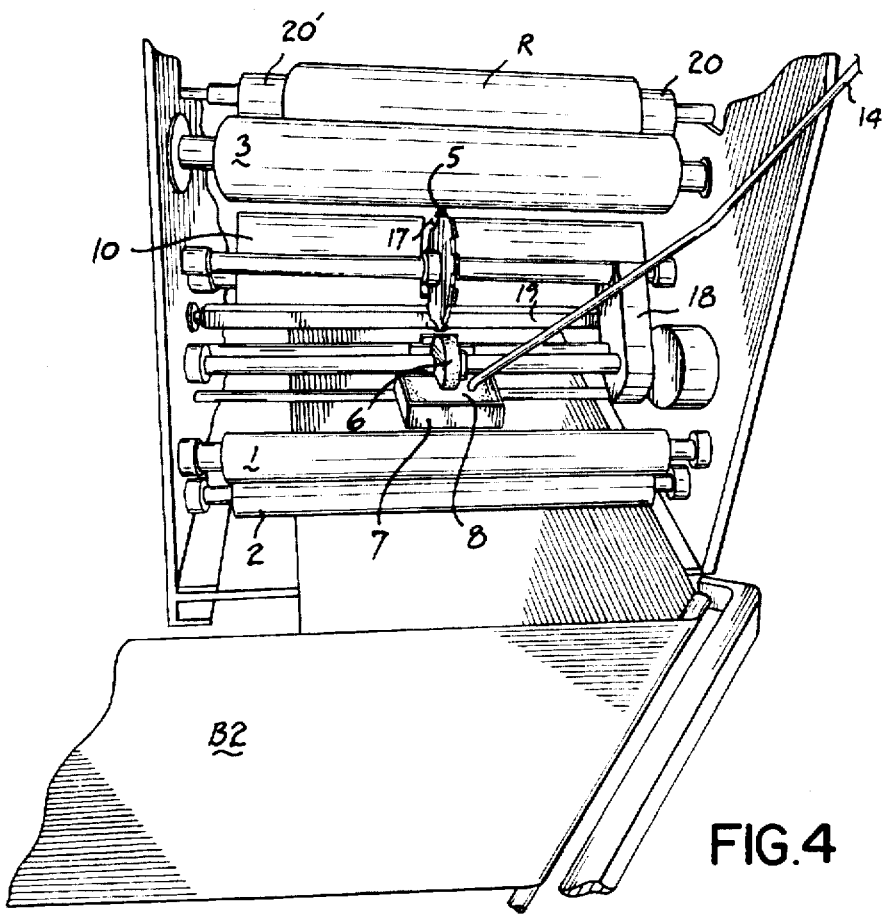
FIG. 4 is a perspective view of the whole device making double layer-rolls, with only one web shown.

FIG. 4 gives an enlarged view of the device making the double layer material of the invention, with only one web (B2) shown to improve the clarity of the drawing. The elements of the previous figures are represented in perspective view, giving a more precise idea of the embodiment.

The web B2 passes below the roll 2, which is itself located below the roll 1 guiding the web B1 (not shown). The latter changes its direction, of an angle of 90°, as well as the webs B2 as shown in the figure. B1 comes however from the right part of said figure, following a symmetrical embodiment. Thus, the winding machine of the invention has for instance two different rolls of one layer paper-like web located symmetrically in relation to the driving axis at the level of the gluing device. In a first step, the unwinding paths are parallel, but the motion are opposite. After the changing of direction, the unwinding paths are still parallel, and the bands are driven in the same direction.

According to already known mechanisms, the wheels 5 and 6 are bound by a continuous link, such as a driving belt or a driving chain, housed in the casing 18. The metal sheet 10 is fixed at its bottom portion to the squared section pipe 19 which can rotate of several degrees (see FIG. 1).

The roll R is sustained by two rotating cones 20, 20' which can be translated according to two different axes, the first one being coaxial to the axis of the roll R, so that said roll R can be removed when it is finished, and the second one being perpendicular to the first one, allowing in particular the adaptation to the growth of the diameter of the roll. This is not exactly the invention, so that it is not necessary to fully describe this part of the machine.

FIG. 5 shows a roll with a glued, double-layer material wound, the gluing area being referenced as S; said area is limited by the dotted lines, which are of course imaginary, drawn for the purpose of clarity. The curve of the deposit of glue is also very diagrammatically illustrated.

In this particular case, the two layers have the same width, but it is possible that one web be of a lesser width as compared to the width of the other web of said roll.

Many other combinations are still possible, according to dimensional criteria, or according to the various qualities of paper, or even according to the width of the glued area . . . The one skilled in the art can chose in relation to the machine which will be used for the making of the dunnage product.

I claim:

1. A method of making material for feeding a machine producing cushioning dunnage comprising the steps of:

providing at least two elongated paper webs at least one of said webs being made of Kraft paper;

applying glue to one of the webs in a gluing area having a length along a longitudinal axis of the one web and a width transverse to the one web longitudinal axis;

varying the transverse location of glue applied to the gluing area as a function of the longitudinal location along the gluing area in order to avoid forming a straight line of glue parallel to the longitudinal axis of the one web; and adhering the at least two webs together with the applied glue.

2. The method of claim 1 wherein the glue is applied to the one web according to a periodic curve.

3. The method of claim 2 wherein the periodic curve is a sinusoidal curve.

4. The method of claim 2 wherein the glue is applied discontinuously along the length of the periodic curve of application.

5. The method of claim 1 wherein the glue is applied to the one paper web centrally of the transverse dimension of the web.

6. The method of claim 1 wherein at least one of the paper webs is made of biodegradable and recyclable paper.

7. The method of claim 1 wherein the glue is an emulsion of plastified homopolymeric polyvinyl acetate.

8. The method of claim 1 further including the step of winding the adhered webs into a roll.

9. The method of claim 1 further including the step of advancing the at least two webs at the same speed while applying the glue to the one web.

10. The method of claim 9 further including the step of merging the respective longitudinal axes of the at least two webs together to adhere the at least two webs together.

11. Material for feeding a machine producing cushioning dunnage made according to any one of claims 1-10.

12. An elongated band of stock material for feeding a machine producing cushioning dunnage comprising:

first and second elongated paper webs at least one of said webs being made of Kraft paper;

said webs adhered together along the lengths of said webs by glue applied to one of said webs in a gluing area having a length along a longitudinal axis of said one web and a width transverse to said one web longitudinal axis;

the transverse location of glue applied to said gluing area varying as a function of the longitudinal location along said gluing area in order to avoid forming a straight line of glue parallel to the longitudinal axis of said one web.

13. The band of stock material of claim 12 wherein said glue is applied to said one web according to a periodic curve.

14. The band of stock material of claim 13 wherein said periodic curve is a sinusoidal curve.

15. The band of stock material of claim 14 wherein said sinusoidal curve is discontinuous.

16. The band of stock material of claim 14 wherein said width of said gluing area is variable and is adjusted by controlling the amplitude of said sinusoidal curve.

* * * * *